(12) United States Patent
Santner et al.

(10) Patent No.: US 7,745,365 B2
(45) Date of Patent: Jun. 29, 2010

(54) BATHTUB-TYPE SPENT CATALYST DISTRIBUTOR FOR EFFECTIVE COUNTER-CURRENT REGENERATION IN FLUID CATALYTIC CRACKING UNITS

(75) Inventors: Chris Santner, Houston, TX (US); Eusebius Gbordzoe, Houston, TX (US); Harvey McQuiston, Katy, TX (US)

(73) Assignee: Stone & Webster Process Technology, Inc., Houston, TX (US)

( * ) Notice: Subject to any disclaimer, the term of this patent is extended or adjusted under 35 U.S.C. 154(b) by 430 days.

(21) Appl. No.: 11/716,350

(22) Filed: Mar. 9, 2007

(65) Prior Publication Data
US 2008/0220965 A1    Sep. 11, 2008

(51) Int. Cl.
*B01J 20/34*    (2006.01)

(52) U.S. Cl. .............................. 502/20; 502/41; 502/34; 502/38; 502/42; 502/48; 422/144; 422/145; 422/139; 422/143; 422/147

(58) Field of Classification Search ........................ None
See application file for complete search history.

(56) References Cited
U.S. PATENT DOCUMENTS
2,548,285 A    4/1951  Bergstrom

| 4,150,090 | A |   | 4/1979  | Murphy et al. |
| 5,635,140 | A | * | 6/1997  | Miller et al. ................ 422/144 |
| 5,773,378 | A |   | 6/1998  | Bussey et al. |
| 6,797,239 | B1 |  | 9/2004  | Chen et al. |
| 6,809,054 | B1 |  | 10/2004 | Myers et al. |
| 2004/0069681 | A1 | | 4/2004 | Peterson et al. |
| 2005/0019228 | A1 | | 1/2005 | Myers et al. |

FOREIGN PATENT DOCUMENTS

| CN | 1 519 296 |   | 8/2004 |
| CN | 1519296   | * | 8/2004 |

* cited by examiner

*Primary Examiner*—Melvin C Mayes
*Assistant Examiner*—Smita Patel
(74) *Attorney, Agent, or Firm*—Locke Lord Bissell & Liddell LLP; Alan B. Clement; Peter J. Fallon

(57) ABSTRACT

An improved spent catalyst regenerator which contains sub-troughs branching off from the main trough, distribution troughs which extend outward from the sides of the main trough and the sub-troughs, and downflow tubes extending downward from the bottom of the main trough and sub-troughs.

14 Claims, 8 Drawing Sheets

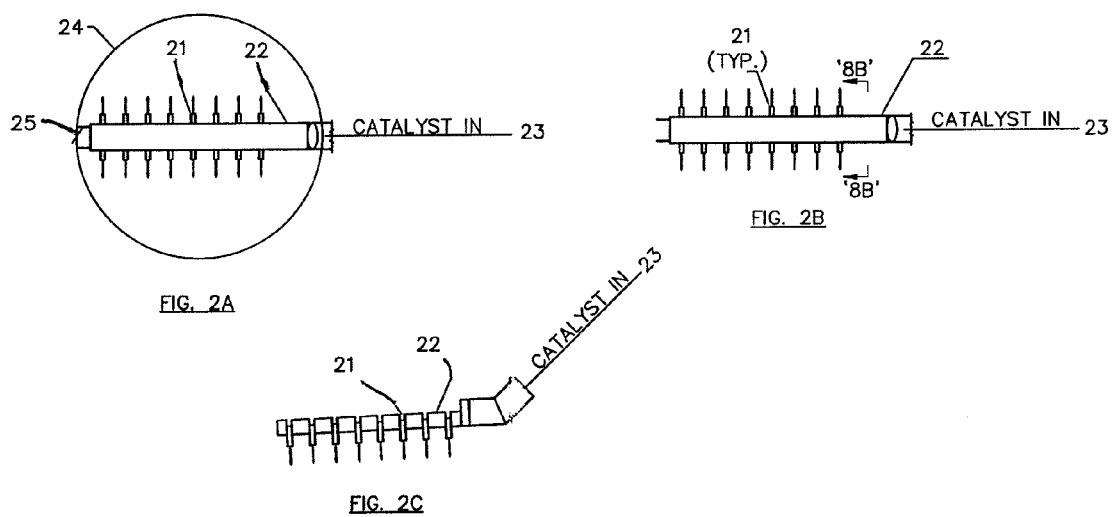

BATHTUB-TYPE SPENT CATALYST DISTRIBUTOR FOR EFFECTIVE COUNTER-CURRENT REGENERATION IN FLUID CATALYTIC CRACKING UNITS

FIELD OF THE INVENTION

The present invention relates to a spent catalyst distributor. More particularly, the present invention relates to a bathtub-type spent catalyst distributor. Most particularly, the present invention is related to a bathtub-type spent catalyst distributor for effective counter-current regeneration in fluid catalytic cracking units.

BACKGROUND OF THE INVENTION

The theory behind spent catalyst distributors has been known for many years. Generally, once catalyst has been used in a cracking process, it is referred to as being "spent" catalyst. The spent catalyst is covered with coke, which covers the active sites on the catalyst thereby substantially reducing the activity of the catalyst. It is possible, however, to remove the coke from the catalyst through the use of a regenerator. The spent catalyst is fed into the regenerator and the deposited coke is burned away, leaving only the catalyst. The hot re-activated catalyst is then removed from the regenerator to be reused in the cracking process. It is a known problem in the art that if the spent catalyst is not distributed into the regenerator in a uniform manner, the catalyst is not regenerated as cleanly, after-burning and the associated temperature increase in the dilute phase of the regenerator is present, and $NO_x$ is generated in undesirable amounts. Several past patents have attempted to resolve the deficiencies of the prior art distribution problems with varying degrees of success.

For example, U.S. Pat. No. 4,150,090 to Murphy et al. teaches an apparatus that is used in the regeneration of cracking catalyst. Arms which carry spent catalyst are connected to a center shaft and extend outward from the shaft but do not touch the outer walls of the regenerator. This patent thus discloses a shape that is very similar to the spokes on a wheel, when viewed from above. However, this design causes the spent catalyst to be distributed in the regenerator in a very uneven manner.

U.S. Pat. No. 5,635,140 to Miller et al. discloses a design for a spent catalyst distributor for a fluid catalytic cracking unit regenerator. In this design, the spent catalyst is aerated in the spent catalyst distributor by air and combustion or exhaust gases. The aeration facilitates the flow of the spent catalyst through the trough arms of the spent catalyst distributor. As in the Murphy patent, arms that carry spent catalyst are connected to a center shaft and extend outward from the shaft. This patent thus discloses a shape that is very similar to the spokes on a wheel, when viewed from above. However, this design also causes the spent catalyst to be distributed in the regenerator in a very uneven manner.

U.S. Pat. No. 6,809,054 to Myers et al. is directed towards a distributor arrangement for introducing spent fluid catalytic cracking catalyst more uniformly across the dense bed of a regenerator to provided more even contact with regeneration gas in order to avoid hot spots and zones of incomplete combustion. This invention also contemplates the possible use of aeration to fluidize the header to further assist catalyst flow. A spent catalyst-carrying arm extends out from the wall of the regenerator and extends towards, but doesn't touch, the opposite wall. This patent also teaches that small arms can extend from the main arm at angles of 90° or 60°. However, this design, while not in the shape of a spoked wheel, also causes the catalyst to be distributed in the regenerator in a very uneven manner.

Accordingly, it would represent an advancement in the art of regenerating spent catalyst in cracking units if there were a design that would allow the distribution of spent catalyst onto the catalyst bed in a very even manner that would improve the efficiency of the regeneration of catalyst.

SUMMARY OF THE INVENTION

It is therefore an object of the present invention to spread the spent catalyst more uniformly across the entire cross-section of the regenerator.

It is a further object of the present invention to achieve a more effective regeneration and a cleaner regenerated catalyst.

It is a further object of the present invention to reduce, if not eliminate, after-burning and the associated temperature increase in the dilute phase of the regenerator.

It is a further object of the present invention to improve the reliability and prolong the life of equipment used in regenerating spent catalyst.

It is a further object of the present invention to cause the spent catalyst to flow in a truly counter-current direction relative to the rising combustion gases.

It is a further object of the present invention to increase catalyst activity retention and reduce catalyst makeup cost.

It is a further object of the present invention to reduce $NO_x$ production during the regeneration of spent catalyst.

Accordingly, these objects and others are achieved by the design of the present invention, which comprises an open channel flow of fluidized spent catalyst through a branched distributor which disperses the spent catalyst in a very even distribution pattern over the regenerator cross-sectional area through use of distribution troughs, sub-troughs and/or downflow tubes.

In preferred embodiments, the main trough is split into multiple sub-troughs to form the shape of a "wye" or "cross", and each multiple trough has several distribution troughs. Preferably, each trough is inclined downwards to aid in catalyst flow.

BRIEF DESCRIPTION OF THE DRAWINGS

FIG. 2A depicts a top view of an embodiment of the present invention containing distribution troughs.

FIG. 2B depicts a second top view of an embodiment of the present invention containing distribution troughs.

FIG. 2C depicts a side view of an embodiment of the present invention containing distribution troughs.

DETAILED DESCRIPTION OF THE PRESENT INVENTION

The following description of preferred embodiments is presented to illustrate the present invention and is not to be construed to limit the scope of the appended claims in any manner whatsoever.

Figure 1A:
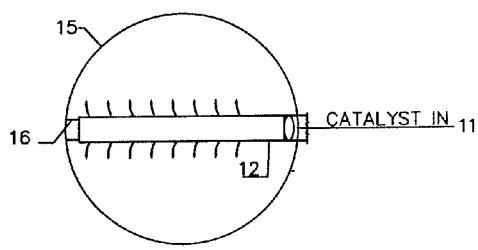
FIG. 1A depicts a top view of the prior art spent catalyst regenerator.
Figure 1B:
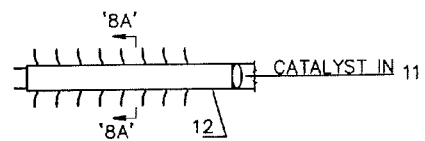
FIG. 1B depicts a second top view of the prior art spent catalyst regenerator.
Figure 1C:
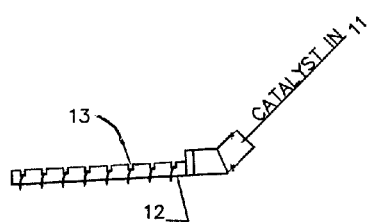
FIG. 1C depicts a side view of the prior art spent catalyst regenerator.

As best shown in FIGS. 1A, 1B and 1C, the prior art is limited to distributing spent catalyst (11) through a main trough (12). As the spent catalyst (11) proceeds along the main trough (12), the spent catalyst (11) flows over the walls of the main trough (12) in specified cutouts (13) of the main trough (12) (see also FIG. 8A). This overflow is schematically represented by arrows. The spent catalyst (11) is distributed in a line across the catalyst bed (not pictured). The main trough (12) can be supported on the vessel wall (15) through a support means (16).

As best shown in FIGS. 2A, 2B and 2C, the present invention improves upon the prior art by adding distribution troughs (21) along each side of the main trough (22). Each distribution trough (21) is angled downward from the main trough (22) so as to facilitate catalyst flow (see FIG. 8B). Spent catalyst (23) therefore flows into the main trough (22) and, as the spent catalyst (23) proceeds along the main trough (22), portions are distributed to the catalyst bed (not pictured) via the distribution troughs (21) along the path of the arrows. Because the distribution troughs (21) extend out from the main trough (22) (see also FIG. 8B), the spent catalyst (23) is distributed in a more even manner along the catalyst bed bottom (not pictured) than in the prior art (see FIGS. 1A, 1B and 1C). It is envisioned that the main trough (22) can be supported on the vessel wall (24) through a support means (25).

Figure 3A:
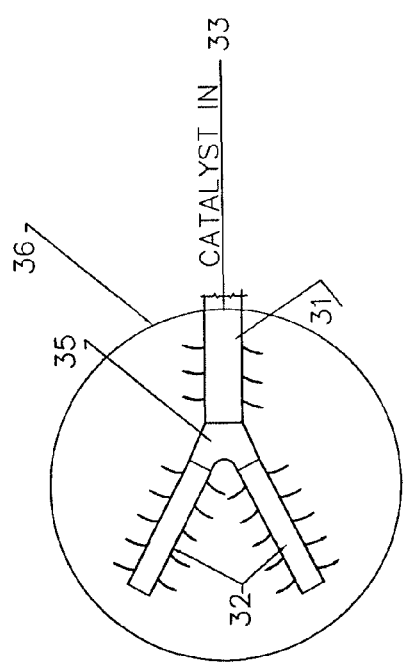
FIG. 3A depicts a top view of a split or "wye" embodiment of the present invention.
Figure 3B:
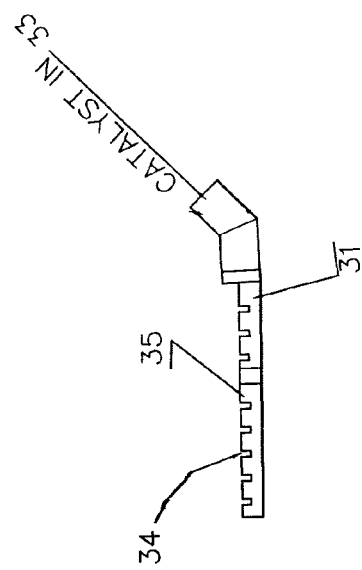
FIG. 3B depicts a side view of a split or "wye" embodiment of the present invention.

FIGS. 3A and 3B depict another embodiment of the present invention that improves over the prior art by splitting the main trough (31) into sub-troughs (32). The term "sub-trough(s)" is not meant to indicate a trough that is smaller than the main trough (31). The term "sub-trough(s)" encompasses any trough (whether larger, smaller or equal in size) that branches off from the main trough (31). The spent catalyst (33) flows into and through the main trough (31). Portions of the spent catalyst (33) are distributed over the walls of the main trough (31) in specified cutouts (34) of the main trough (31) (see also FIG. 8A). The arrows represent this overflow. Not all of the spent catalyst (33) is distributed through the cutouts (34), and remaining spent catalyst (33) is diverted into sub-troughs (32), which branch out from the main trough (31). The branches can begin at any point (35) along the main trough (31). As the spent catalyst (33) traverses the sub-troughs (32), portions of the spent catalyst (33) are distributed over the walls of the sub-troughs (32) in specified cutouts (34) of the sub-troughs (32). The arrows represent this overflow. Because the sub-troughs (32) extend out from the main trough (31), the spent catalyst (33) is distributed in a more even manner along the catalyst bed bottom (not pictured) than in the prior art (see FIGS. 1A, 1B and 1C). It is envisioned that the sub-troughs (32) can be supported on the vessel wall (36) through a support means (not pictured).

Figure 4A:
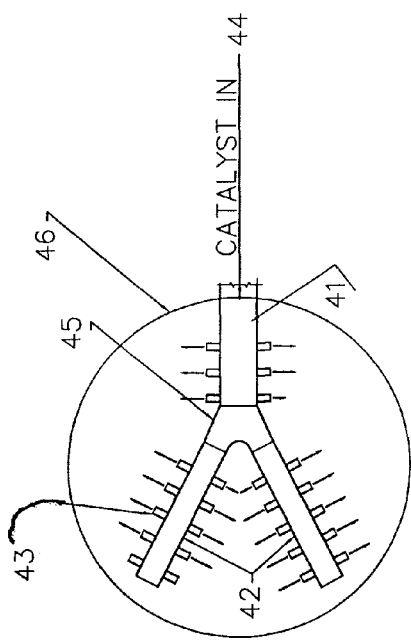
FIG. 4A depicts a top view of a split or "wye" embodiment of the present invention containing distribution troughs.
Figure 4B:
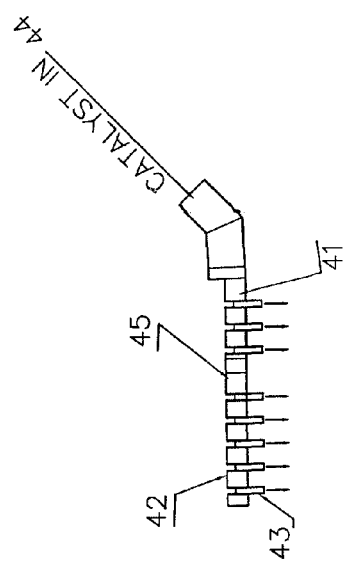
FIG. 4B depicts a side view of a split or "wye" embodiment of the present invention containing distribution troughs.

FIGS. 4A and 4B embody yet another preferred embodiment of the present invention in which the improvement over the prior art is achieved by splitting a main trough (41) into sub-troughs (42). Furthermore, distribution troughs (43, only some are designated) line the sides of both the main trough (41) and sub-troughs (42) (see also FIG. 8B). The spent catalyst (44) flows into and through the main trough (41), and, as the spent catalyst (44) proceeds along the main trough (41), portions are distributed to the catalyst bed bottom (not pictured) via the distribution troughs (43) located on the main trough (41). Not all of the spent catalyst (44) is distributed through the main trough's (41) distribution troughs (43). Remaining spent catalyst (44) is then diverted into sub-troughs (42) which branch out from the main trough (41). The branches can begin at any point (45) along the main trough (41). Once spent catalyst (44) enters the sub-troughs (42), it is distributed to the catalyst bed (not pictured) via the distribution troughs (43) located on the main trough (41). Because the distribution troughs (43) extend out from both the main trough (41) and the sub-troughs (42) (see also FIG. 8B), the spent catalyst (44) is distributed in a more even manner along the catalyst bed bottom (not pictured) than in the prior art (see FIGS. 1A, 1B and 1C). It is envisioned that the sub-troughs (42) can be supported on the vessel wall (46) through a support means (not shown).

Figure 5A:
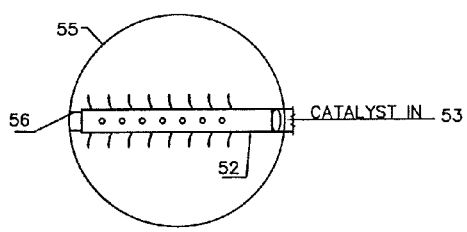
FIG. 5A depicts a top view of a fourth embodiment of the present invention containing downflow tubes.
Figure 5B:
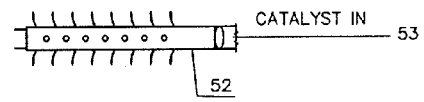
FIG. 5B depicts a second top view of a fourth embodiment of the present invention containing downflow tubes.
Figure 5C:
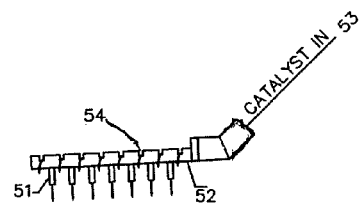
FIG. 5C depicts a side view of a fourth embodiment of the present invention containing downflow tubes.
Figure 8A:
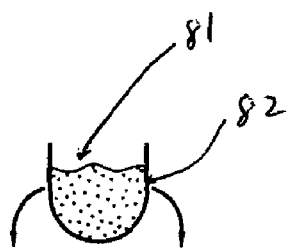
FIG. 8A depicts a cutaway view of a trough without downflow tubes or distribution troughs.
Figure 8B:
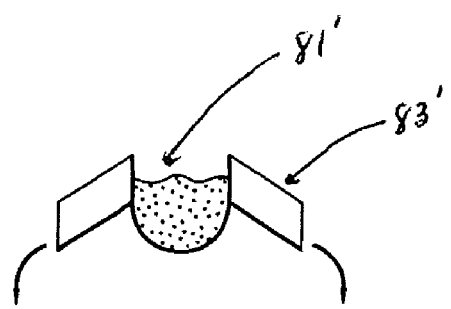
FIG. 8B depicts a cutaway view of a trough with distribution troughs.
Figure 8C:
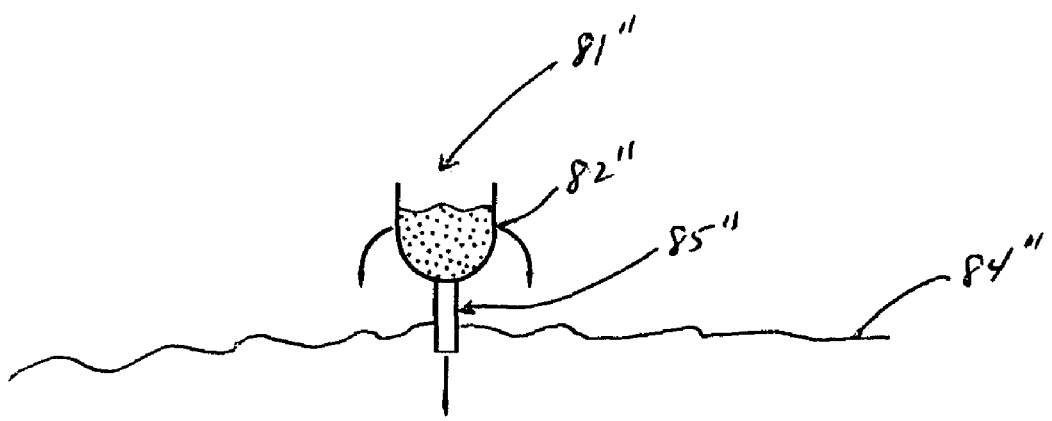
FIG. 8C depicts a cutaway view of a trough with downflow tubes.

FIGS. 5A, 5B and 5C embody yet another preferred embodiment of the present invention in which downflow tubes (51 in FIG. 5C and depicted as circles in FIG. 5A and FIG. 5B) are provided in the middle of the main trough (52) (see also FIG. 8C). As the spent catalyst (53) proceeds along the main trough (52), portions are distributed over the walls of the main trough (52) in specified cutouts (54) of the main trough (52). The arrows represent the overflow. Not all of the spent catalyst (53) is distributed through the cutouts (54). A percentage of the spent catalyst (53) is distributed via the downflow tubes (51 in FIG. 5C and depicted as circles in FIG. 5A and FIG. 5B). These downflow tubes (51 in FIG. 5C and depicted as circles in FIGS. 5A and 5B) extend from the bottom of the main trough (52) to below the surface of the catalyst bed (see FIG. 8C). In a preferred embodiment, the downflow tubes (51 in FIG. 5C and depicted as circles in FIG. 5A and FIG. 5B) extend from the bottom of the main trough (52), past the surface of the catalyst bed, and into the upper part of the catalyst bed (not shown). Because the spent catalyst (53) is distributed both above and below the catalyst bed surface (not shown), the spent catalyst (53) is distributed in a more even manner than in the prior art (see FIGS. 1A, 1B and 1C). It is also envisioned that the main trough (52) can be supported on the vessel wall (55) via a support means (56).

Figure 6A:
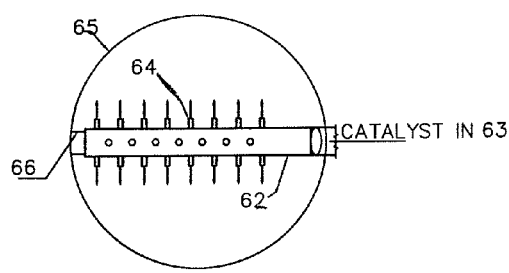
FIG. 6A depicts a top view of a fifth embodiment of the present invention containing downflow tubes and distribution troughs.
Figure 6B:
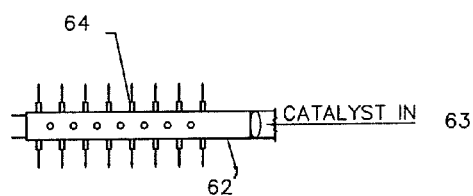
FIG. 6B depicts a second top view of a fifth embodiment of the present invention containing downflow tubes and distribution troughs.
Figure 6C:
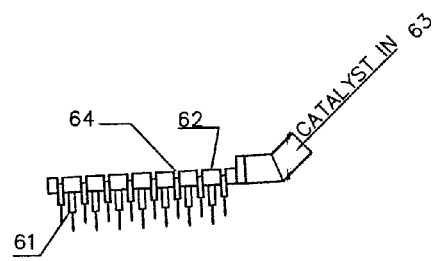
FIG. 6C depicts a side view of a fifth embodiment of the present invention containing downflow tubes and distribution troughs.

FIGS. 6A, 6B and 6C depict still yet another preferred embodiment of the present invention. In this preferred embodiment downflow tubes (61 in FIG. 6C, not shown in FIG. 6A or 6B) are provided in the bottom of the main trough (62) and distribution troughs (64) along each side of the main trough (62). As the spent catalyst (63) proceeds along the main trough (62), portions are distributed by the distribution troughs (64). Each distribution trough (64) is angled downward from the main trough (62) so as to facilitate catalyst flow. Spent catalyst (63) therefore flows into the main trough (62) and, as the spent catalyst (63) proceeds along the main trough (62), portions are distributed to the catalyst bed (not pictured) via the distribution troughs (64) along the path of the arrows. Not all of the spent catalyst (63) is distributed through the distribution troughs (64). A percentage of the spent catalyst (63) is distributed via the downflow tubes (61 in FIG. 6C, not shown in FIG. 6A or 6B). These downflow tubes (61 in FIG. 6C, not shown in FIG. 6A or 6B) extend from the bottom of the main trough (62) to below the surface of the catalyst bed (see FIG. 8C). In a preferred embodiment, the downflow tubes (61 in FIG. 6C, not shown in FIG. 6A or 6B) extend from the bottom of the main trough (62), past the surface of the catalyst bed, and into the upper part of the catalyst bed (not shown). Because the distribution troughs (64) extend out from the main trough (62) (see also FIG. 8B), and since some of the spent catalyst (63) is deposited beneath the surface of the catalyst bed, the spent catalyst (63) is distributed in a more even manner along and throughout the catalyst bed (not pictured) than in the prior art (see FIGS. 1A, 1B and 1C). It is also envisioned that the main trough (62) can be supported on the vessel wall (65) via a support means (66).

Figure 7:
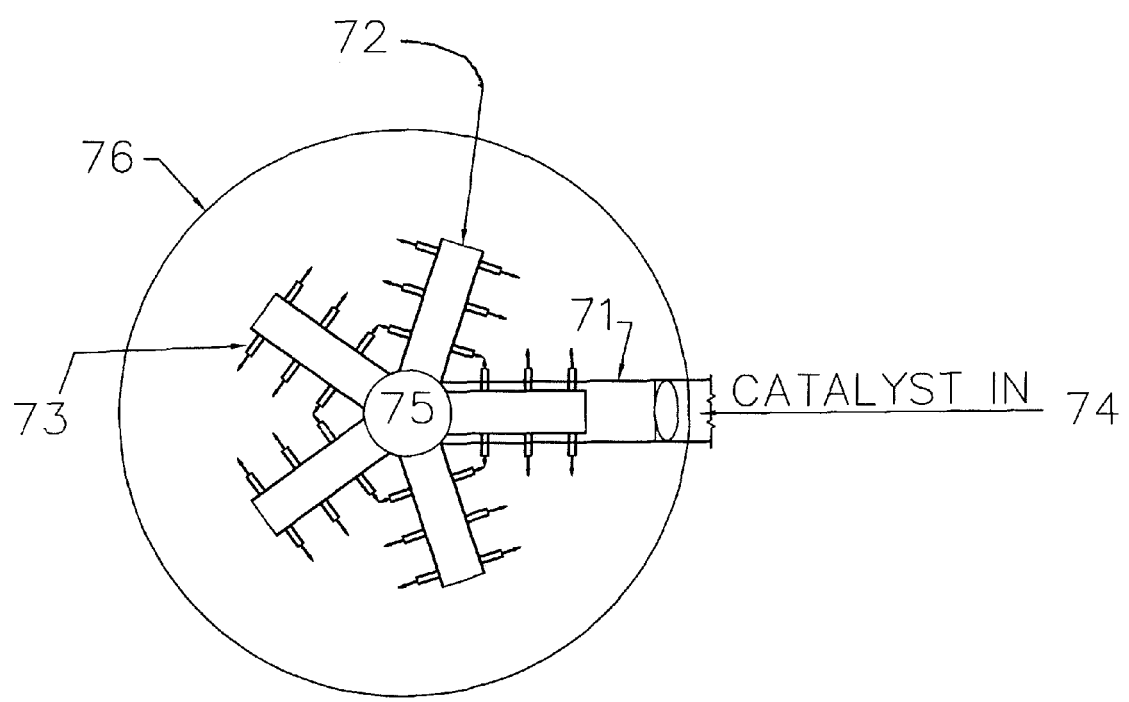
FIG. 7 depicts a top view of a multiply split embodiment of the present invention containing distribution troughs.

FIG. 7 shows another preferred embodiment of the present invention in which a main trough (71) is split into several sub-troughs (72). Furthermore, distribution troughs (73, only some are designated) line the sides of the sub-troughs (72) (see also FIG. 8B). It is envisioned (but not shown) that distribution troughs (73) could also line the sides of the main trough (71). The spent catalyst (74) flows into and through the main trough (71), and, as the spent catalyst (74) proceeds along the main trough (71), portions of the spent catalyst (74) are distributed over the walls of the main trough (71) through cutouts (similar to FIG. 3B) of the main trough (71). Not all of the spent catalyst (74) is distributed through the cutouts. The remaining spent catalyst (74) is then diverted into sub-troughs (72) which branch out from the main trough (71). The branches can begin at any point (75) along the main trough (71). It is envisioned that all branches can begin at the same or different points (75) along the main trough (71). Once spent catalyst (74) enters the sub-troughs (72), it is distributed to the catalyst bed (not pictured) via the distribution troughs (73) located on the sub-troughs (72). Because the distribution troughs (73) extend out from the sub-troughs (72) (see also FIG. 8B), the spent catalyst (74) is distributed in a more even manner along the catalyst bed (not pictured) than in the prior art (see FIGS. 1A, 1B and 1C). It is envisioned that the sub-troughs (72) can be supported on the vessel wall (76) through a support means (not shown).

FIG. 8A shows a head-on point of view of a main trough (81) of the prior art along line 8A in FIG. 1A. As spent catalyst flows through the main trough (81), spent catalyst flows over the walls of the main trough (81) at cutouts (82) in the direction of the arrows and is deposited on the catalyst bed below (not shown).

FIG. 8B shows a head-on point of view of a main trough (81') in the present invention along line 8B in FIG. 2A. As spent catalyst flows through the main trough (81'), spent catalyst flows through the distribution troughs (83') in the direction of the arrows and is deposited on the catalyst bed below (not shown).

FIG. 8C shows a head-on point of view of a main trough (81") in the present invention along line 8C in FIG. 5A. As spent catalyst flows through the main trough (81"), spent catalyst flows over the walls of the main trough (81") at cutouts (82") in the direction of the arrows and is deposited on the catalyst bed (84"). Additional spent catalyst flows through the main trough, travels downward through the downflow tubes (85"), and is deposited below the surface of the catalyst bed (84").

In all the embodiments of the present invention, the spent catalyst is introduced into the regenerator from a catalytic cracking unit, although the present inventors contemplate that the invention may be employed in other applications that would benefit from improved distribution of particulate matter. It is envisioned that single stage, two-stage regenerators and side-by-side reactor/regenerator configurations can be utilized with the invention. Additional designs that may be forthcoming in the art can also be utilized with the invention.

It is envisioned that any number and combination of sub-troughs, distribution troughs, and/or downflow tubes can be utilized with the invention as long as an even manner of spent catalyst distribution is achieved. It is also envisioned that the spent catalyst can be aerated either from external sources or from captured flue gas inside the regenerator bed or unaerated in any manner known in the art as the need arises.

Having described the present invention, it will now be apparent that many changes and modifications may be made to the above-described embodiments without departing from the spirit and the scope of the present invention.

The above-mentioned patents are hereby incorporated by reference.

The invention claimed is:

1. A method of distributing spent catalyst in a spent catalyst regenerator for a fluidized catalytic cracking unit comprising the steps of:
   a. collecting spent catalyst in a substantially elongated main trough and, optionally, fluidizing and/or aerating said spent catalyst;
   b. passing a percentage of said spent catalyst from said main trough to a plurality of sub-troughs; and
   c. feeding said spent catalyst from said plurality of sub-troughs and from said main trough to a catalyst bed surface,
wherein said spent catalyst is fed from said main trough and said plurality of sub-troughs to said catalyst surface bed via a plurality of cutouts located on the walls of said main trough and said plurality of sub-troughs.

2. The method of claim 1 wherein said spent catalyst is fed from said main trough and said plurality of sub-troughs to said catalyst surface bed via a plurality of distribution troughs located on the sides of said main trough and said plurality of sub-troughs.

3. The method of claim 2 wherein at least one of said plurality of distribution troughs is angled downward.

4. The method of claim 1 wherein a plurality of downflow tubes are connected to the bottom of said main trough, and further comprising the steps of
   a. passing some of said spent catalyst to said plurality of downflow tubes; and
   b. feeding said spent catalyst in said plurality of downflow tubes to said catalyst bed surface.

5. The method of claim 4 wherein at least one of said plurality of downflow tubes extends below said surface of said catalyst bed and said spent catalyst is deposited below said surface of said catalyst bed.

6. The method of claim 5 wherein at least one of said plurality of downflow tubes extends below said surface of said catalyst bed and into the upper part of said catalyst bed, and said spent catalyst is deposited into the upper part of said catalyst bed.

7. The method of claim 2 wherein a plurality of downflow tubes are connected to the bottom of at least one selected from the group consisting of said main trough and said plurality of sub-troughs, and further comprising the steps of:
  a. passing some of said spent catalyst to said plurality of downflow tubes; and
  b. feeding said spent catalyst in said plurality of downflow tubes to said catalyst bed surface.

8. The method of claim 7 wherein at least one of said downflow tubes extends below said surface of said catalyst bed and said spent catalyst is deposited below said surface of said catalyst bed.

9. The method of claim 8 wherein at least one of said downflow tubes extends below said surface of said catalyst bed and into the upper part of said catalyst bed, and said spent catalyst is deposited into the upper part of said catalyst bed.

10. The method of claim 2 wherein at least one of said plurality of distribution troughs is angled downward.

11. A method of distributing spent catalyst in a spent catalyst regenerator for a fluidized catalytic cracking unit comprising the steps of:
  a. collecting spent catalyst in a substantially elongated main trough and, optionally, fluidizing and/or aerating said spent catalyst;
  b. passing a percentage of said spent catalyst from said main trough to a plurality of downflow tubes located on the bottom of said main trough;
  c. feeding said spent catalyst remaining in said main trough to a catalyst bed surface via at least one selected from the group consisting of a plurality of cutouts located along the walls of said main trough and a plurality of distribution troughs located on the sides of said main trough; and
  d. feeding said spent catalyst in said plurality of downflow tubes to said catalyst bed surface.

12. The method of claim 11 wherein at least one of said plurality of distribution troughs is angled downward.

13. The method of claim 11 wherein at least one of said plurality of downflow tubes extends below said surface of said catalyst bed and said spent catalyst is deposited below said surface of said catalyst bed.

14. The method of claim 13 wherein at least one of said plurality of downflow tubes extends below said surface of said catalyst bed and into the upper part of said catalyst bed, and said spent catalyst is deposited into the upper part of said catalyst bed.

* * * * *